(12) United States Patent
Heath et al.

(10) Patent No.: US 7,196,040 B2
(45) Date of Patent: Mar. 27, 2007

(54) MICROCAPSULE WELL TREATMENT

(75) Inventors: Stephen Mark Heath, Aberdeen (GB); Hugh Malcolm Bourne, Banchory (GB)

(73) Assignee: T R Oil Services Limited, Aberdeen (GB)

( * ) Notice: Subject to any disclaimer, the term of this patent is extended or adjusted under 35 U.S.C. 154(b) by 261 days.

(21) Appl. No.: 10/297,690

(22) PCT Filed: Jun. 6, 2001

(86) PCT No.: PCT/GB01/02482

§ 371 (c)(1),
(2), (4) Date: Aug. 21, 2003

(87) PCT Pub. No.: WO01/94744

PCT Pub. Date: Dec. 13, 2001

(65) Prior Publication Data

US 2004/0043906 A1   Mar. 4, 2004

(51) Int. Cl.
*C09K 8/52* (2006.01)
*C09K 8/54* (2006.01)

(52) U.S. Cl. ............ 507/219; 507/207; 507/211; 507/212; 507/221; 507/224; 507/230; 507/231; 507/203; 507/261; 507/269; 507/902; 507/939; 166/304

(58) Field of Classification Search .......... 507/902, 507/219, 207, 211, 212, 221, 224, 230, 231, 507/203, 261, 269, 939; 166/304
See application file for complete search history.

(56) References Cited

U.S. PATENT DOCUMENTS

| 2,836,555 | A | * | 5/1958 | Armentrout | 507/112 |
|---|---|---|---|---|---|
| 3,659,651 | A | * | 5/1972 | Graham | 166/280.2 |
| 3,676,363 | A |   | 7/1972 | Mosier | |
| 4,614,599 | A | * | 9/1986 | Walker | 507/103 |
| 4,738,897 | A |   | 4/1988 | McDougall et al. | |
| 4,741,401 | A | * | 5/1988 | Walles et al. | 166/300 |
| 4,770,796 | A | * | 9/1988 | Jacobs | 507/260 |
| 4,919,209 | A | * | 4/1990 | King | 166/300 |
| 4,986,353 | A | * | 1/1991 | Clark et al. | 166/279 |
| 4,986,354 | A |   | 1/1991 | Cantu et al. | |
| 5,073,276 | A | * | 12/1991 | Newlove et al. | 507/224 |
| 5,102,559 | A | * | 4/1992 | McDougall et al. | 507/260 |
| 5,164,099 | A | * | 11/1992 | Gupta et al. | 507/214 |
| 5,893,416 | A |   | 4/1999 | Read | |
| 5,922,652 | A | * | 7/1999 | Kowalski et al. | 507/129 |
| 6,059,034 | A | * | 5/2000 | Rickards et al. | 166/280.2 |
| 6,184,184 | B1 | * | 2/2001 | Amin et al. | 507/238 |
| 6,207,620 | B1 | * | 3/2001 | Gonzalez et al. | 507/277 |
| 6,357,527 | B1 | * | 3/2002 | Norman et al. | 166/300 |
| 6,380,136 | B1 | * | 4/2002 | Bates et al. | 507/90 |
| 6,444,316 | B1 | * | 9/2002 | Reddy et al. | 428/407 |
| 6,803,347 | B1 | * | 10/2004 | Ladva et al. | 507/137 |
| 6,818,594 | B1 | * | 11/2004 | Freeman et al. | 507/101 |

* cited by examiner

Primary Examiner—Philip C. Tucker

(57) ABSTRACT

A material and a device for releasing chemicals in a fluid environment is disclosed, and a method for releasing substances into downhole fluid environments. The invention also relates to materials for sand control and hydraulic fracturing. The substance release device typically comprises a polymeric material for releasing a substance into a downhole fluid environment in a well, and in preferred embodiments the material comprises a spherical, plastic chemical release capsule which is hard, permeable and may encapsulate a range of solids and/or liquids for subsequent release. These solids or liquids can include inhibitors such as scale inhibitors and other oilfield production chemicals for release into the wellbore of an oil or gas producing well or a water injection well.

24 Claims, 5 Drawing Sheets

MICROCAPSULE WELL TREATMENT

This application is a 371 of PCT/GB01/02482 filed Jun. 6, 2001.

This invention relates to material for releasing chemicals in a fluid environment, and to a method of producing the material. In particular, this invention relates to materials for sand control and hydraulic fracturing, the same materials releasing chemicals in a fluid environment, and to a method of producing these materials.

Advances in drilling and completion technology have revolutionised new field development and in-fill drilling strategies. The use of subsea and/or horizontal well completions is now common and in some cases these complex wells require sand control measures to be installed to maintain the integrity of the wellbore and prevent it collapsing. A variety of well completions are conventionally used for sand control purposes including fracture packing and gravel-packing techniques, prep-packed screens, wire wrapped screens and expandable screens. It is preferred that the flow of fluids through the sand control system is not impaired since this can reduce the productivity and/or injectivity of the well. Hydraulic fracturing is used to improve well productivity. It is therefore preferred that the flow of fluids into and through the propped fracture is not impaired since this can also reduce the productivity and/or injectivity of the well.

The installation of subsea and/or horizontal well completions also increase the complexity, logistical difficulty and cost of intervention for the mitigation of production chemistry problems such as inorganic scale formation, asphlatene and wax deposition, corrosion and bacterial growth on the wellbore conduits.

According to the present invention there is provided a substance release device comprising a polymeric material for releasing a substance into a downhole fluid environment in a well.

In preferred embodiments the material comprises a spherical, plastic chemical release capsule which is hard, permeable and may encapsulate a range of solids for subsequent release. These solids can include inhibitors such as scale inhibitors and other oilfield production chemicals for release into the wellbore of an oil or gas producing well or a water injection well.

The material can be used for sand control and for hydraulic fracturing (for clarity the material shall herein be termed "a proppant" when it is applied to hydraulic fractures) and well clean up. The material can be used for sand control purposes whilst also providing controlled release of oilfield production chemicals from within the sand control medium. This includes application in gravel packed, fracture packed and pre-packed screen sand control systems. The material can also be used for more effective well clean up after completion in both injection and production wells via the controlled release of enzyme based materials that release acids to dissolve any mineral deposits and breakdown residual bio-polymers from the well completion process. The material can be used for hydraulic fracturing purposes whilst also providing controlled release of oilfield production chemicals from within the proppant medium. In addition this material may be used for hydraulic fracturing and either or both the controlled release of oilfield chemicals and proppant flow back control. The material may also be used within the rathole of a well to provide controlled release of an oilfield chemical into the aqueous environment.

Preferably the polymeric material is used for sand control and hydraulic fracturing.

Preferably the polymeric material is permeable.

The material can comprise a polymeric plastics material such as polypropylene, polyethylene, high density polyethylene, high density polypropylene, polyethylene terephthalates, polyamides (both aliphatic and aromatic), liquid crystal polymers, liquid engineered resins, starch and polyhydroxy alkanoates or mixtures of these.

The material typically comprises a matrix that provides the material with support, and which contains the chemical to be released.

Other materials may be used as the matrix such as acrylic, polybutylene, polycarbonate, polyester, polystyrene, polyurethane, polyvinyl chloride, polycaprolactone, polybutylene terephthalate, polyvinyl alcohol, polylactic acid, polyglycolide, polyester amide, polyimides, acrylonitrile-butadiene-styrene, acrylonitrile-styrene-acrylate, polyoxymethylene, polybutylene, polyisobutylene, polyvinylbutyral, epichlorohydrin elastomer, nitrile elastomer, nitrile rubber, polyetherketone, polyetheretherketone, polyetherketoneketone, polymethylmethacrylate, polyethylene oxide, polyphenylene oxide, polysulphones, polyethersulphone, polyurea, chlorinated polyethylene, ethylene-chlorofluoroethylene, tetrafluoroethylene-perfluoropropylene, Perfluoroalkoxy, silicon rubbers and other polymeric materials consisting of mixtures of the above and copolymers, terpolymers and hydrophobically/hydrophilically modified and crosslinked derivatives of the above.

Other materials can be used instead of or in addition to the polymeric or plastics material, such as thermoplastic rubber, resins, hot melt adhesives, fibreglass, silicones, fluorosilicones e.g. Ryton, polysiloxanes, fluoroelastomers e.g. Viton, Aflas, fluorocarbons e.g. PTFE, PVDF, halogenated polymers, cellulose, polysaccharides, lignin, chitin, gums and mixtures and derivatives of the above.

In addition waxes, calcium stearate, and metallocene can be used instead of or in addition to the polymeric or plastics material.

The material contains a high active content of scale inhibitor, or the chemical to be released, typically, 10–90 wt %/v. The high mass of inhibitor contained within the capsule can reduce (and on some wells potentially eliminate) the need for scale related intervention. In addition, the high loading of inhibitor offers the potential for significant treatment lifetime with minimal product deployment.

The release of the scale inhibitor can be further controlled by changing its solubility in the brine phase or by restricting contact between the inhibitor salt and the brine phase. The solubility of the inhibitor in the brine phase can be reduced by increasing the ratio of the polyvalent cation to inhibitor in the precipitated salt or by changing the nature of the polyvalent cation. Careful selection of the polymer type or the use of hydrophobic additives can reduce water ingress into the porous matrix and thus reduce inhibitor release.

In certain embodiments the hardness of the material can be varied by changing the chemical composition of the polymer plastic matrix and/or cross-linking the polymer plastic material or by reinforcing the particle matrix with natural, synthetic, glass or metal fibres, sand, silicates or other minerals and ceramic matrices such as bauxite, resins, carbon or boron based materials and impact modifiers. The unconfined compressive strength would be in the range 500–100,000 psi.

In other embodiments the material can be selected to have an oil tolerance which can be adjusted by changing the chemical composition of the polymer plastic matrix and/or modifying the hydrophobic or hydrophilic properties of the polymer matrix or cross-linking the polymer matrix with a suitable reagent. In addition, the chemical resistance to acids and oil may be increased by the addition of a chemical stabiliser, for example Ebonite.

The capsules are typically of permeable polymeric material, and are manufactured using an underwater pelletising system consisting of an extrusion and either a spheronisation or granulation process. The capsules typically contain a high active content of scale inhibitor, typically, 10–90 wt %/v. The particles can be produced over a wide range of sizes. The size distribution of the particles in a sample of material can be large, with a heterogeneous distribution of particles of different sizes, or small, with a fairly homogeneous range of similarly sized particles (so called mono dispersed particles). The range of preferred sizes is typically 250 μm–5 mm, with the distribution of size being typically ±5% of the mean size.

The density of the capsules can be controlled by the variation of the type of polymer matrix and/or by including a weighting agent such as barite, zirconium oxide, manganese oxide, titanium dioxide, tungsten or magnetite. The hardness, compressive strength and elastic properties (rigidity and elongation/deformation) can be controlled by the variation of the type of polymer matrix and/or including a strengthening agent such as glass, sand, minerals, carbon or boron fibres and/or an impact modifier. The unconfined compressive strength is between 500–100,000 psi.

The material is typically extruded from a pelletising system. A single or twin screw system can be used, and other mixers such as Farrell and Banbury mixers or a Feeder extruder can be used.

Mono dispersed spherical particles (i.e. a relatively homogeneous mixture of similarly sized particles) can be produced over a wide range of particle size, typically 250 μm–5 mm, with the distribution of size being typically ±5% of the mean size. The variation in particle size can allow certain embodiments of the invention to provide gravel packs of different mesh sizes, where in certain embodiments there is an advantage in having a narrow range of particle sizes in the one application. The spherical and mono dispersed nature of the particles typically provides better packing in the gravel pack and a more uniform pore throat size. This can provide more effective sand control and reduce the turbulence in the pore throats, thus improving the gravel pack permeability.

In certain embodiments, the material can have a low and adjustable density and that can be adjusted by changing the chemical composition of polymeric matrix and/or by adding a weighting agent such as barite, tungsten, zirconium oxide or magnetite or any other material denser than the polymer. The optional low density of the material can provide more effective gravel pack placement and simplify the gravel-packing operation, especially in deviated wells because the high viscosity fluids normally needed to carry dense proppant and/or gravel pack material through a pipeline system will not be needed.

In certain embodiments, typically for application in rat holes, the polymer matrix can slowly degrade over a time period of 1 week to 10 years leaving little or no residue. This will typically enable re-treatment of the product into the rathole once the product has degraded. The lifetime of the plastic capsule can be adjusted by changing the chemical composition and molecular weight of the polymeric matrix and/or incorporating a dissolution agent such as heavy aromatic napthas, peroxides, per sulphates, enzymes and metal oxide catalysts into the spherical plastic capsule. The rate and lifetime of release of the encapsulated chemical can be controlled such that it corresponds to the degradation lifetime of the polymer matrix material. This may be achieved by varying the amount of encapsulated chemical in the polymer matrix material, changing the chemical composition of the polymer matrix and the inhibitor salt or by coating the polymer matrix and/or coating the encapsulated inhibitor salt.

In certain embodiments, for application in gravel packs and hydraulic fractures, the polymeric material is preferably somewhat pliable so that it can display a slight amount of deformation at the point of contact, increasing the surface area of contact between particles. In gravel packs and hydraulic fractures this reduces the effect of applied stress and can result in improved sand and proppant flowback control respectively. The amount of deformation of the polymer matrix required to control sand production and proppant flowback can be adjusted by changing the chemical composition of the matrix and/or including a strengthening agent such as glass, sand, minerals, carbon or boron fibres and/or an impact modifier. Laboratory data from stressed cyclic flow back tests with mixtures of conventional proppant and chemically impregnated conventional porous proppant had indicated that although these mixtures passed the initial conductivity tests the proppant pack collapsed under cyclic stress and flowed out of the test apparatus. However, when the same tests were repeated with mixtures of conventional proppant and this polymeric material no proppant flow back was observed. This was attributed to cohesion of the proppant pack induced by the flowback control characteristics of the polymeric material.

Most preferred embodiments of the material comprise spherical capsules although other shapes may be in accordance with the invention. Spherical capsules have the additional advantage for gravel pack applications in that they can be packed more efficiently into a defined space than other shapes of material. In addition, the use of a more homogeneous particle size typically leads to the formation of more homogeneous pore throats. This can afford the gravel pack more effective sand control characteristics and can reduce the turbulence within the sand or proppant pack, which may lead to an increased effective permeability.

In preferred embodiments of the invention the material is charged with any scale inhibitor suitable for the purpose of inhibiting scale in a well bore formation. This may include water soluble organic molecules with carboxylic acid, aspartic acid, maleic acids, sulphonic acids, phosphonic acid and phosphate esters groups including copolymers, ter-polymers, grafted copolymers and derivatives of the above. Examples of such compounds include aliphatic phosphonic acids such as diethylene triamine penta (methylene phosphonate) and polymeric species such as polyvinylsulphonate. The scale inhibitor can be in the form of the free acid but is preferably in the form of mono and polyvalent cation salts such as Na, K, Al, Fe, Ca, Mg, $NH_4$.

The chemicals can be solid and mixed with the matrix to give a generally homogeneous mixture comprising the plastics matrix and the chemical. Alternatively, the scale inhibitors etc can be encapsulated in liquid form e.g. by being immobilised, absorbed or encapsulated in an appropriate matrix such as a diatomised clay, resin, starch or other polysaccharide material, polyvinyl alcohol and super-adsorbing polymers and then being incorporated in solid form into the main product matrix.

The material can contain scale inhibitor in most preferred embodiments but instead in other embodiments either no chemical is included in the formulation or a wide range of other oil field chemicals such as inhibitors can be carried including but not limited to corrosion inhibitors, biocides, wax and asphaltene control chemicals, pour point suppressants, dispersants, hydrate and halite inhibitors, demulsifiers, gel breakers, tracers, drag reducers and well clean up chemicals including enzymes. These can also be encapsulated in either solid or liquid form into the material.

Certain embodiments of the present invention tackle sand and combined sand/scale control in gravel packed and pre-packed screen wells by using a hard, permeable, spherical plastic capsule, optionally carrying a chemical substance such as an inhibitor, although other embodiments can simply provide an alternative material to sand or gravel for use in gravelpacks. The plastic capsule can be manufactured using a hot melt extrusion and spheronising process and can optionally contain approximately 10–90 wt % of active scale inhibitor and can benefit from a low and adjustable density. The high mass of inhibitor contained within the particle can reduce the need for scale-related intervention and offers the potential for significant treatment lifetime. The low density of the particle also aids placement and simplifies the gravel packing operation. In addition, the spherical nature and mono dispersed characteristics of the plastic capsule can provide more effective packing and a uniform pore throat size for the gravel pack. This can provide improved sand control and increase the pack permeability through reduced turbulence at pore throats. The provision of a material for sand and/or combined sand/scale control in e.g. gravel packed and pre-packed screen wells comprising a hard, optionally permeable material with or without a loading of chemical to be delivered to the well is another aspect of the present invention, typically where the material comprises a number of particles having a narrow size range e.g. 400 um+/−5–10%.

The invention also provides a method of treating a well, the method comprising loading a substance into a polymeric material, inserting the material into the well, and allowing the substance to leach from the polymeric material into the well.

Typically the material is inserted into a fissure, fracture, screen area, gravel pack, fracture pack or a pre-packed screen, usually as part of the well completion.

The invention also provides a method of forming a chemical-releasing particle for release of chemicals in a fluid environment, the method comprising mixing the chemical to be released with a matrix material forming the particle, and thereafter forming the particle (e.g. by melting, mixing and/or extrusion of the mixture) from the mixture of the matrix and the chemical, so that the chemical is dispersed (preferably homogeneously) throughout the formed particle.

In an extruder system, the polymeric matrix material and the other additives are typically fed into the top of the extruder via a hopper at the rear of the extruder system. The extruder is preferably an auger type mixer, which is typically heated to melt the polymer matrix. The auger screw system then typically mixes and disperses the other additives in the molten polymer as the mixture typically moves along the auger screw. Typically a vent is provided before the material reaches the head of the extruder to allow gas or moisture to escape. However this venting can be further enhanced by fitting a vacuum pump to more effectively withdraw gas and moisture. The mixture typically proceeds into a throat which typically slows down the mixture and typically increases the pressure before typically releasing the mixture in the form of strands of typically circular cross section that are extruded through apertures in an extrusion head. The strands are then typically cooled in a water bath and typically pelletised into cylindrical pellets using a chopper. The temperature of the heated extruder screw is normally dependent on the melting point of the polymers, but the typical extrusion temperatures vary between 100° C. and 400° C.

The invention also provides a polymeric downhole proppant.

The invention also provides a method of supporting a well or a portion thereof, comprising disposing a support material in the well or portion to be supported, wherein the support material comprises a polymeric material.

The invention also provides a polymeric material for use downhole for the control of particulate matter entering the production stream of the well.

The invention also provides a method of controlling the entry of particulate matter into the production stream of a well, the method comprising disposing a number of polymeric devices into the wellbore between the formation and the production fluids outlet of the well.

Examples of the present invention will now be described by way of illustration only and with reference to the accompanying figures, wherein FIG. 1 is a schematic representation of apparatus for producing devices according to the invention;

To form the capsules an underwater pelletising process is used, which utilises an extruder having either a single screw or twin screw system. A single screw extruder comprises a steel tube of variable length, which has one single shaft screw that rotates at speed in the tube as it is heated, melting the polymer and mixing it as it is pushed down the tube. A twin screw extruder consists of two co-rotating screws in a single barrel with a variety of mixing zones down the length of the heated barrel in which both screws work together to mix and blend. This works the material more effectively compared with a single screw extruder and a better dispersion of the solid additives into the polymer is achieved.

The dispersion of the material additives into the binder or polymer can be divided into four steps:
(a) wetting of the additives=pre-mixing of the additives with the binder;
(b) dispersion of agglomerates into aggregates and primary particles;
(c) distribution into the binder or polymer;
(d) stabilisation against re-agglomeration.

Figure 1:
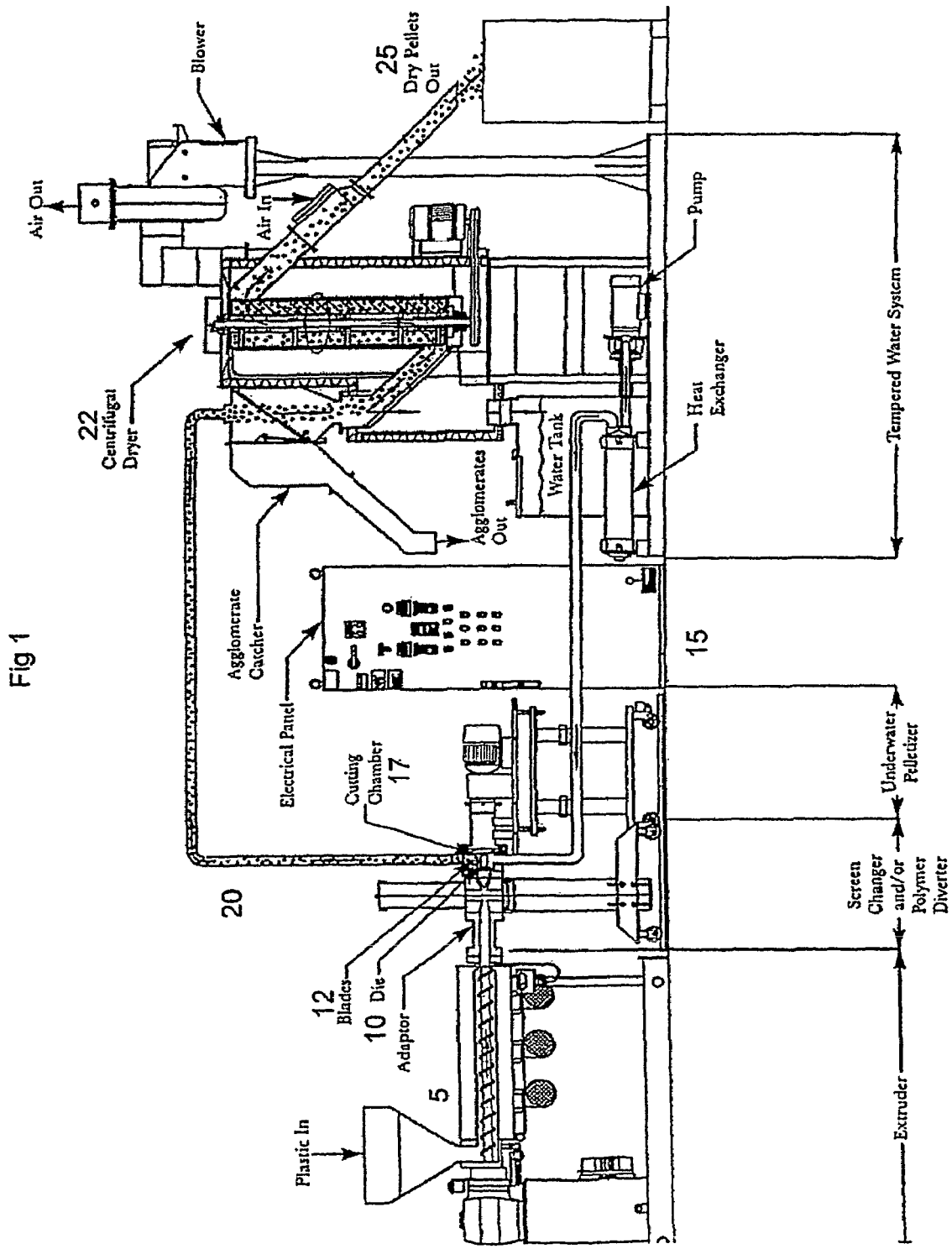

The plastic/chemical mix is then introduced into a known underwater pelletising system shown in FIG. 1. The FIG. 1 system is suitable generally for producing pellets according to the invention.

The pre-extruded cylindrical pellets or the polymeric matrix material and additives for example inhibitors and weighting agents are fed via a hopper into an extruder or melt pumps which force the molten mixture through a screen changer and/or polymer diverter valve, which helps build up the pressure at the head, and for the start-up of the run. A gear pump can be used to regulate the flow of polymer to the head to keep the pressure evenly distributed throughout the system. The mixture then flows through a die 10 having a series of holes arranged in a circular pattern. As the mixture emerges from the holes, it is cut into lengths by rotating blades 12 and is solidified into pellets by process water which is pumped through conduits 15 across the material face in the cutting chamber 17. Tempered water transfers the pellets via conduits 20 to a centrifugal dryer and spheroniser 22 where the water and the pellets are separated and the dry spherical pellets are discharged via chute 25. The process water is filtered, pressurised, tempered and returned to the Cutting chamber 17. The system can produce pellets (e.g. mono dispersed pellets) typically at between 10 to 6000 kg/hr in a size range typically from 40 μm to 5 mm±5%.

The extrusion process may be combined with a Farrell bridge consisting of two mixing areas. In the first area the mixture is melted and mixed in an upper chamber using single screw, before it is dropped down to two co-rotating screws in the bottom chamber, where further mixing of the product occurs before it is delivered to the head of the chamber. A venting process takes place between the top and bottom chambers to remove any moisture. This venting process can be enhanced by use of a vacuum pump system.

A hole may be cut into the side of the extruder, usually two-thirds of the way down the barrel and it is used to feed additives and fillers directly into the barrel, commonly termed a feeder extruder.

An oil-heated drum mixer or Banbury Mixer may be used to slowly turn and blend the polymers and additives. The additives usually need to be more thermally stable and the mixing process is much slower.

The spherical plastic capsule may have a variable oil tolerance which can be adjusted by changing the chemical composition of the polymer plastic matrix and/or modifying the hydrophobic or hydrophilic properties of the polymer plastic matrix or cross-linking the polymer plastic matrix with a suitable reagent. To modify the polymer a thermally stable hydrophobic group such as an aliphatic or an aromatic amide, lauryl or phosphate ester, or any other hydrophobic group is grafted onto the polymer backbone as a side chain. This provides the polymer with improved oil or water resistance depending on the nature of the polymer matrix and the modification process. In the cross-linking process, the polymer molecules are linked using peroxide, silanes and metallocene chemicals to form a more complex macromolecular structure. This is then cured at various temperatures to achieve improved strength and oil, water, acid and bacterial resistance.

The scale inhibitors may be encapsulated in liquid form if they are immobilised on an appropriate matrix such as a diatomised clay, resin, super-adsorbing polymer and high porosity versions (~40–50%) of the main polymer matrix material. In the immobilisation process a liquid is incorporated into a solid matrix by a spray drying, shear mixing, emulsion polymerisation, coating or by a simple soaking process in which the liquid is either imbibed into or adsorbed onto the surface of the solid material.

Coatings can be applied to the outer surfaces of the capsules; for example, organic surfactants and waxes can be added to the polymer melt or applied to the outer surfaces of the resultant particle to achieve improved oil, water, acid and bacterial resistance. In addition, the polymer melt additive or surface coating can also be used to control the release rates of the encapsulated chemical into the wellbore of an oil or gas producer well or a water injection well.

The resultant spherical particles may be injected into an oil well or water injection well. Certain embodiments of the particles can withstand particularly high pressures associated with such wells. The particles may be injected into the rat-hole, hydraulic fractures or into the annulus in gravel packed, fracture packed and pre-packed sand screen completed wells. The chemicals such as scale inhibitors will gradually over time leak out from the particles and so treat the local environment accordingly. The release rate can be controlled by varying the amount of encapsulated chemical in the polymer matrix material, changing the chemical composition of the polymer matrix and the inhibitor salt or by coating the polymer matrix and/or coating the encapsulated inhibitor salt.

EXAMPLES

Example 1

Extrusion Temperature 165° C.–200° C.

Particles were produced using the above FIG. 1 device and having the following proportion of constituents:

40% PP/HDPE (60/40 mix of polypropylene/high density polyethylene)—as the plastic matrix material; The material can be added as a fine powder of average size 0–100 μm.

30% Magnetite (Iron oxide)—as the weighting agent; The material can be added as a fine powder with an average particle size of 1–100 μm.

30% Solid Polycarboxylate—as a scale inhibitor salt. The material can optionally be added as a fine powder with an average particle size of 1–100 μm, and typically around 70 μm or less.

The plastic matrix material and the other two components were added into the hopper and fed into the top of the extruder. The mixture was then melted within the heated auger type mixer and the components dispersed in the polymer matrix, as described earlier in the manufacturing process, before being extruded using the underwater pelletising system also described earlier. The finished capsule was particularly suitable for rat hole applications where a weighting agent is normally necessary to keep it in place and prevent it from floating out of position. The specific gravity of this material was ~1.4 and it's unconfined compressive strength was >500 psi. The product was also thermally stable in both brine and oil up 140° C. However, above this temperature the product will soften and agglomerate and may break down in crude oil. The scale inhibitor was an optional constituent, and this can be omitted in embodiments intended for gravelpack applications.

Example 2

Extrusion Temperature 165° C.–200° C.

Particles were produced using the above FIG. 1 device and having the following proportion of constituents:

60% PP/HDPE (60/40 mix of polypropylene/high density polyethylene)—as the plastic matrix material; The material can be added as a fine powder with an average particle size of 1–100 μm.

2% Tungsten—as the weighting agent; The material can be added as a fine powder with an average particle size of 1–100 μm.

38% Solid Polycarboxylate. The material can be added as a fine powder with an average particle size of 1–100 μm.

This capsule was manufactured as detailed for the previous example. The product is typically suitable for scale control in rat holes. The reduction in the amount of weighting agent in the plastic capsule optionally allows more scale inhibitor to be loaded into the product agent, thus potentially increasing the treatment lifetime. The reduction in the amount of weighting agent also increases the compressive strength. The specific gravity of this material was ~1.20 and its unconfined compressive strength was greater than 1000 psi. The product displayed a thermal stability similar to that in Example 1. Again, the scale inhibitor was an optional constituent, and this can be omitted in embodiments intended for gravelpack applications.

Example 3

Extrusion Temperature 200–220° C.

Particles were produced as described for the previous 2 examples and having the following proportion of constituents:

50% PP/HDPE (60/40 mix of polypropylene/high density polyethylene)—as the plastic matrix material. The material can be added as a fine powder with an average particle size of 1–100 μm 30% Glass—Strengthening Agent. The material can be added as a fine powder with an average particle size of 1–100 μm.

20% Solid THPS (Tetrakishydroxymethylphosphonium sulphate)—as a biocide salt. The material can be added as an agglomerate with an average particle size of 50–2000 μm.

This capsule was manufactured as detailed for the previous example. The extrusion temperature was slighter higher to ensure the glass which was added as a fine powder was properly dispersed during the extrusion process. The addition of glass strengthens the capsule by up to 10% as well as increasing the oil resistance and thermal stability of the product to over 150° C. The specific gravity of this material was ~1.20. The unconfined compressive strength was 1100 psi. This capsule can be used for the control of sulphate reducing bacteria to prevent the generation of $H_2S$ and associated corrosion problems.

Example 4

Extrusion Temperature 200° C.–240° C.

Particles were produced as described above for the previous three examples and having the following proportion of constituents:

80% PET/PP (20/80 mix of polyethylene terephthalate [PET]/polypropylene[PP])—as the plastic matrix material; the material can be added as a fine powder with an average particle size of 1–100 μm.

20% Solid Phosphonate—as a scale inhibitor salt. The material can be added as a fine powder with an average particle size of 1–100 μm.

This capsule was manufactured as detailed for the previous two examples. The inclusion of polyethylene terephthalate in the main matrix material strengthened the bead by a factor of 3 and can be suitable for applications that require the capsule to withstand high pressures. In addition, the inclusion of PET imparts more oil resistance and increase the thermal stability of the product to >180° C. The specific gravity of the material was ~1.3 and it's unconfined compressive strength was >3400 psi.

Example 5

Extrusion Temperature 200–260° C.

This capsule was manufactured as detailed for the previous two examples and having 100% Polyamide (Nylon) as the plastic material.

The use of polyamide as the main matrix material provided even more strength than the bead as quoted in Example 4. The compressive strength was again increased by a factor of 3 and use of Polyamide increases the chemical resistance and thermal stability of the product to >250° C. The material can be suitable for sand control in applications that require the plastic capsule to withstand extremely high pressures and, in addition, the polyamide matrix material can display a slight amount of deformation and can be used for proppant flowback control in hydraulic fractures and gravel packs. Typically this embodiment excludes any substance to be released from the capsule, but can incorporate such substances if desired.

The specific gravity of this material was ~1.2–1.3 and its unconfined compressive strength exceeded 12000 psi.

Example 6

Extrusion Temperature 200° C.–260° C.

This capsule was manufactured as detailed for the previous two examples and has the following proportion of constituents:

70% Polyamide—as the plastic matrix material. The material can be added as a fine powder with an average particle size of 1–100 μm.

30% Solid Phosphonate—as a scale inhibitor salt. The material can be added as a fine powder with an average particle size of 1–100 μm.

This capsule can be used for sand and proppant flow back control and combined sand/proppant flow back and scale control in gravel packs, fracture packs, screen wells and hydraulic fractures.

Figure 2:
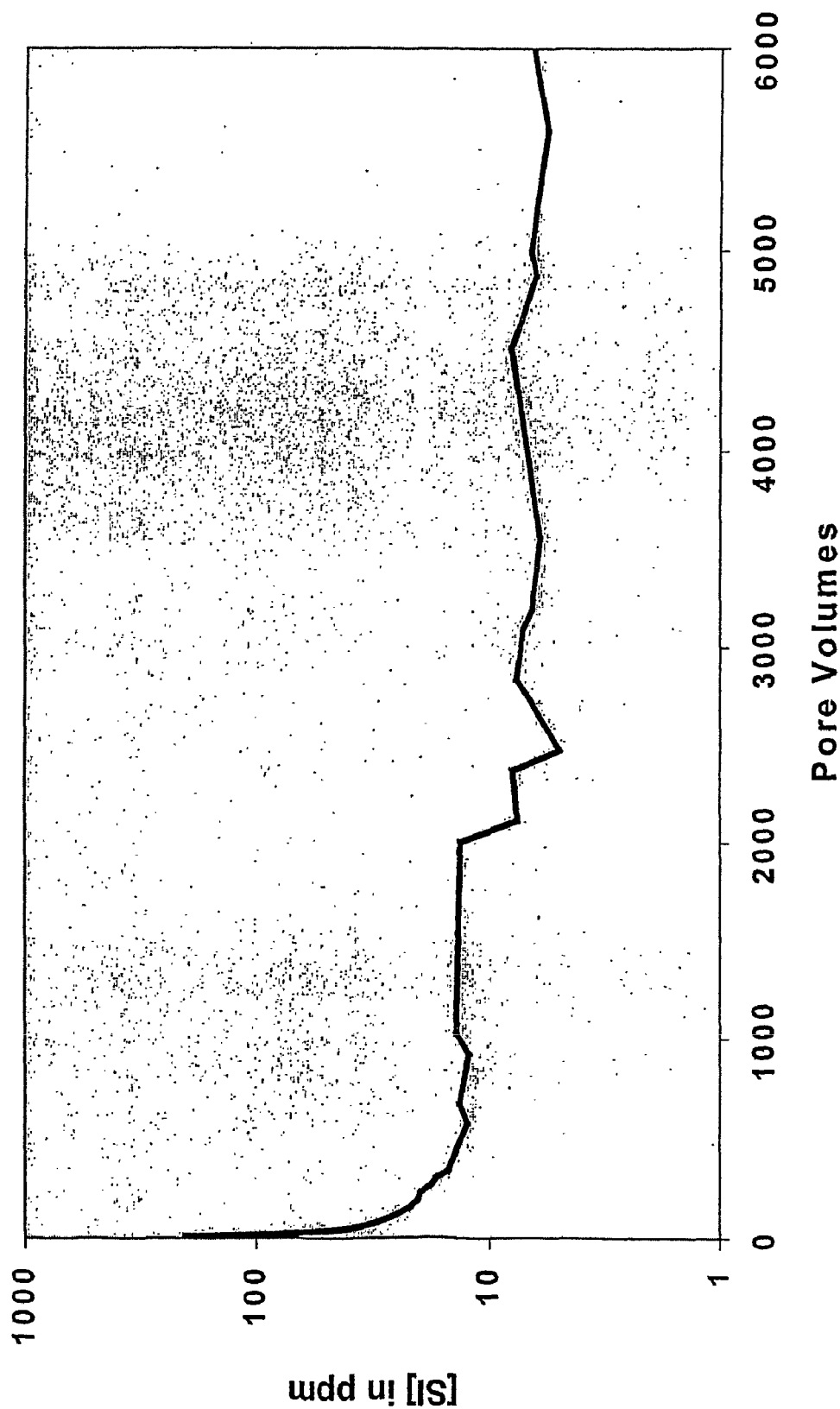
FIG. 2 is a graph plotting the concentration of scale inhibitor against the number of cycles of fluid passing through a closed system.

FIG. 2 shows the concentration of scale inhibitor released versus the number of pore volumes of fluid eluted through the packed material. One pore volume is defined here as approximately 25% of the total volume of the packed material and corresponds to the volume in the system that is not occupied by the plastic material. It can be seen from FIG. 2 that the release of scale inhibitor is constant even after 6000 pore volumes. Therefore, the scale inhibitor is released at a constant low level for long periods of time.

Figure 3:
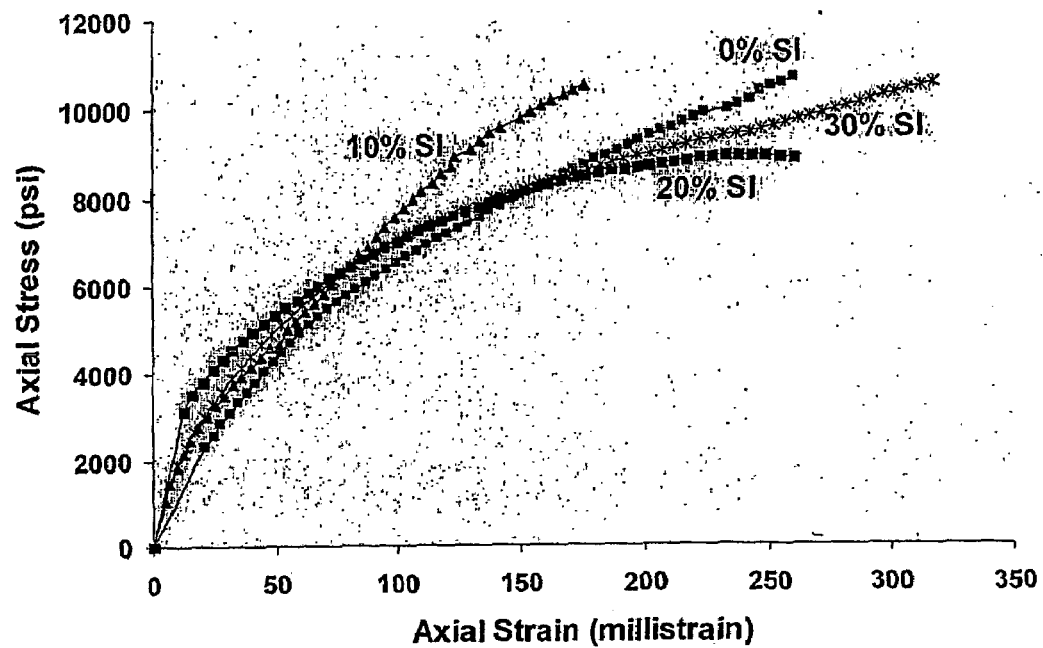
FIG. 3 shows the plot of compressive stress (psi) versus axial strain for certain embodiments of devices.

It can be seen from FIG. 3 that the material in Example 5 does become slightly strained as the stress is increased to >8000–10000 psi. Therefore a slight amount of deformation of the material does occur in both the presence and absence of scale inhibitor.

The specific gravity of this material was ~1.3 and its unconfined compressive strength was greater than 10,0500 psi.

Example 7

Extrusion Temperature 165° C.

This capsule was manufactured as detailed for the previous two examples and having the following proportion of constituents:

40% HDPE (high-density polyethylene)—as the plastic matrix material. The material can be added as a fine powder with an average particle size of 1–100 μm.

30% Barite (barium sulphate)—as the weighting agent. The material can be added as a fine powder with an average particle size of 1–500 μm.

30% solid polycarboxylate—as a scale inhibitor salt. The material can be added as a fine powder with an average particle size of 1–100 μm.

The specific gravity of this material was ~1.3 and its compressive strength was >600 psi. The product was also thermally stable in both brine and oil up to between 140° C. The finished capsule is particularly suitable for scale control in rat hole applications.

Example 8

Extrusion Temperature 165° C.

This capsule was manufactured as detailed for the previous two examples and having the following proportion of constituents:

40% HDPE (high-density polyethylene)—as the plastic matrix material. The material can be added as a fine powder with an average particle size of 1–100 μm.

30% Rutile (titanium dioxide)—as the weighting agent. The material can be added as a fine powder with an average particle size of 1–500 μm.

30% solid polycarboxylate—as a scale inhibitor salt. The material can be added as a fine powder with an average particle size of 1–100 μm.

The specific gravity of this material was ~1.3 and its compressive strength was >1000 psi. The product displayed similar thermally stability to material in example 7. The finished capsule is particularly suitable for scale control in rat hole applications.

Example 9

Extrusion Temperature 200° C.–260° C.

This capsule was manufactured as detailed for the previous two examples and having the following proportion of constituents:

65% Polyamide/HDPE (74/16 mix of polyamide/high density polyethylene)—as the plastic matrix material; The material can be added as a fine powder with an average particle size of 1–100 μm.

28% Solid Phosphonate—as a scale inhibitor salt. The material can be added as a fine powder with an average particle size of 1–100 μm.

2% lauric diethanol amine—as an anti static agent. This material can either be added as a liquid or as a fine powder with an average particle size of 1–100 μm.

5% Calcium Stearate—as a lubricant. The material can be added as a fine powder with an average particle size of 1–100 μm.

This capsule can be used for sand and proppant flow back control and combined sand/proppant flow back and scale control in gravel packs, fracture packs, screen wells and hydraulic fractures.

Figure 4:
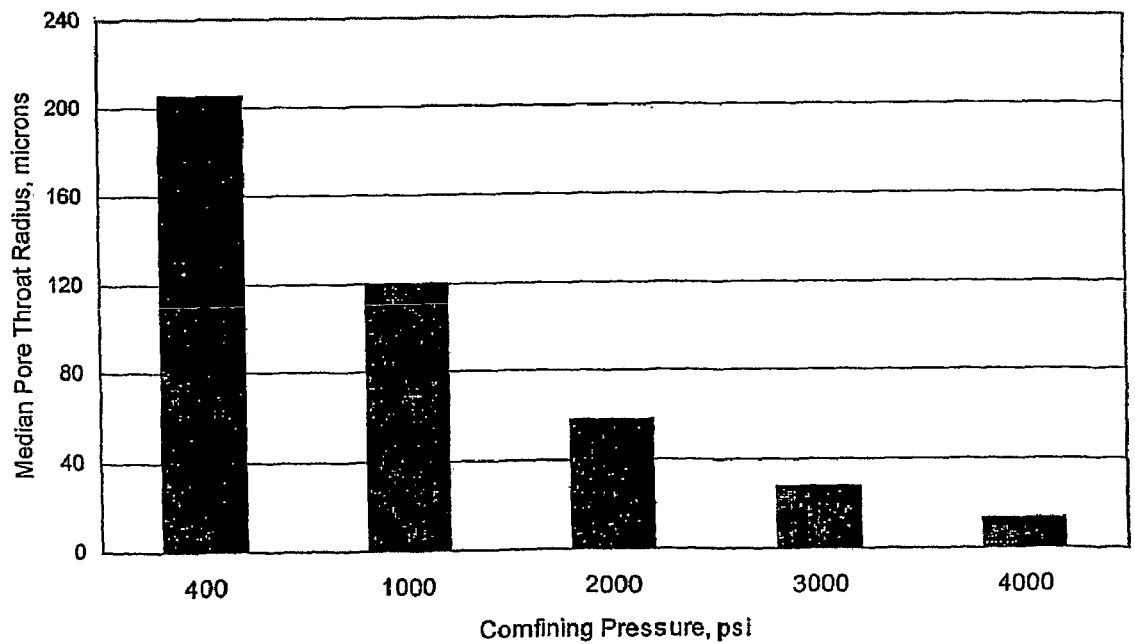
FIG. 4 shows a graph of pore throat size distribution versus gravel pack compressive stress as determined from a mercury stress injection test on a further embodiment.

FIG. 4 shows the pore throat size distribution versus the gravel pack compressive stress as determined from a mercury stress injection test (as documented in SPE 8294. It can be seen from FIG. 4 that the pore throat size distribution is reduced exponentially with increasing compressive stress, with significant deformation occurring at >3000 psi, namely, an 87% reduction in pore throat size and a substantial reduction in permeability to air. The data indicates that at a typical gravel pack compressive stress of 2000 psi the product demonstrated acceptable strength characteristics.

This material can be manufactured down to 500±25 μm. The specific gravity of this material is ~1.2 and it's confined compressive strength was >2000 psi.

Example 10

Extrusion Temperature 165° C.–200° C.

This capsule was manufactured as detailed for the previous two examples and having the following proportion of constituents:

65% HDPE—as the plastic matrix material; The material can be added as a fine powder with an average particle size of 1–100 μm.

30% Solid Phosphonate—as a scale inhibitor salt. The material can be added as a fine powder with an average particle size of 1–50 μm.

2% lauric diethanol amine—as an anti static agent. This material can be added as a liquid or as a fine powder with an average particle size of 1–100 μm.

3% wax—as a lubricant. This material can be added as a molten liquid or as a fine powder with an average particle size of 1–100 μm.

Figure 5:
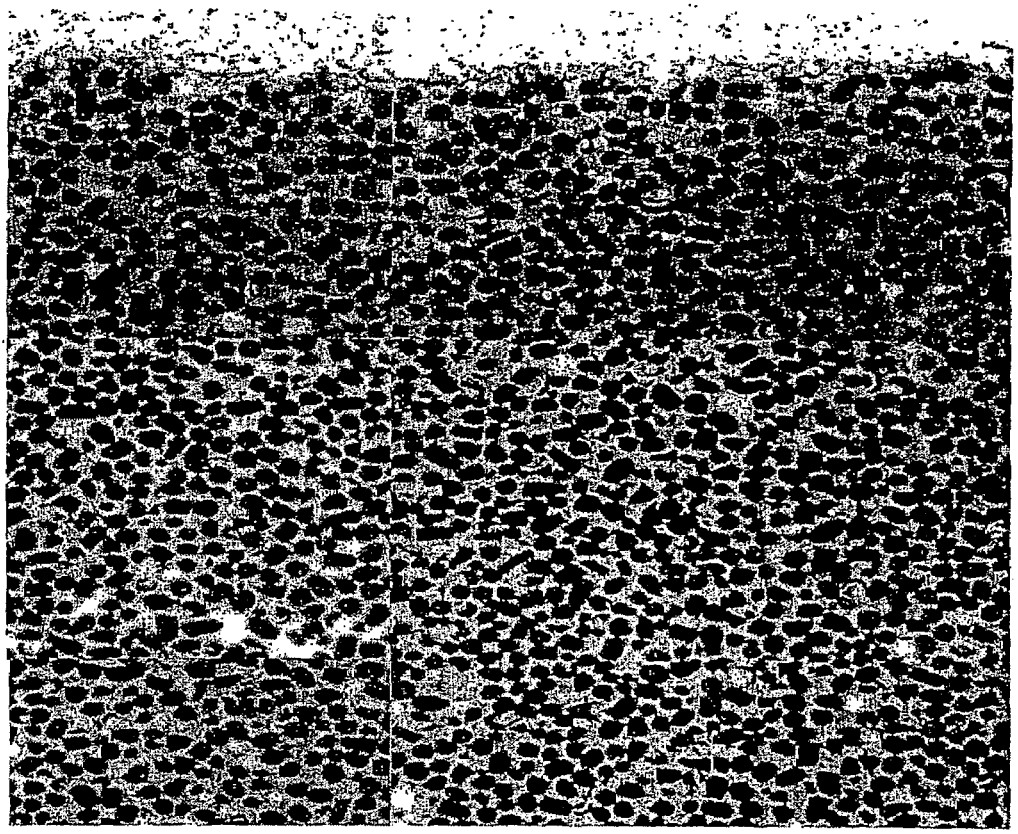
FIG. 5 shows a thin section photomicrograph of a sand slurry injection test of a further embodiment.

FIG. 5 shows a photomicrograph of a thin section of a gravel pack of the above 300 μm material taken from a sand slurry injection test. The sand material was injected as a 1 wt %/v slurry at 50 ml/minute and the average diameter (D50) of the sand particles was 100 μm. It can be seen from FIG. 5 that none of injected sand passed into or out of the 300 μm gravel pack material. Therefore the above material provided effective sand control at 300 μm.

This material can be manufactured down to 300±15 μm. The specific gravity of this material is ~1.2 and it is thermally stable in both oil and brine to >140° C.

Example 11

Extrusion Temperature 180° C.–220° C.

This capsule was manufactured as detailed for the previous two examples and having the following proportion of constituents:

70% PolyHydroxyAlkanoate (PHA)—as the degradable polymer matrix material. This material can be added as an agglomerate with an average granule size of 1–3 mm.

30% solid phosphonate—as a scale inhibitor salt. This material can be added as a fine powder with an average particle size of 1–100 μm.

The finished capsule is particularly suitable for scale control in rat hole applications. The material has been designed to degrade or slowly dissolve so that it is possible to re-treat the rat hole without the need for expensive remedial cleaning procedures.

Figure 6:
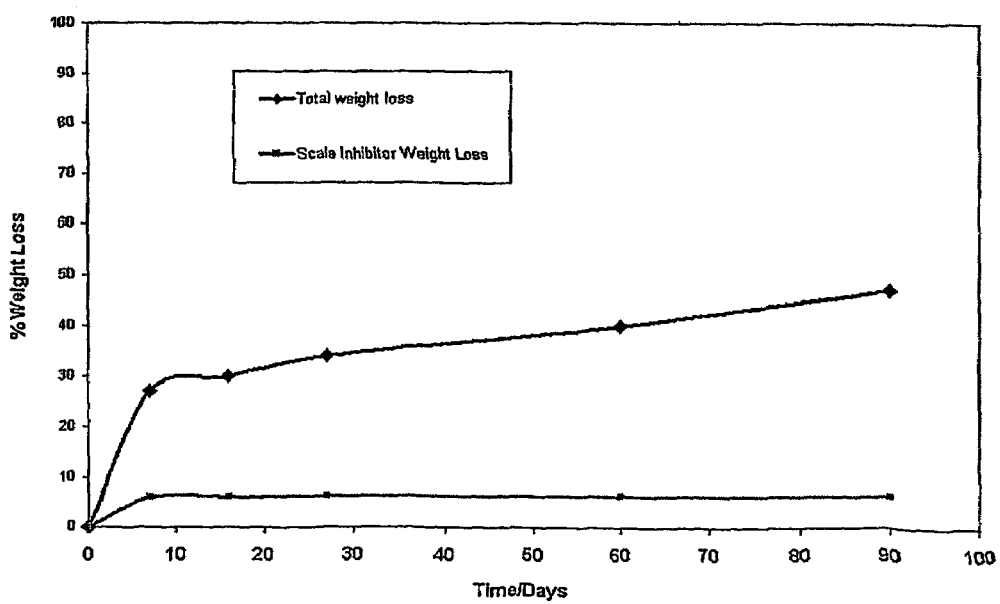
FIG. 6 shows a graph of the % weight loss of total material and scale inhibitor versus the degradation time of the another embodiment of material in days at 107° C.

FIG. 6 shows the % weight loss of the total material and scale inhibitor versus the degradation time in days at 107C. It can be seen from FIG. 6 that the material has undergone a substantial total weight loss. A comparison of the total weight loss with the % mass loss profile due to the release of the encapsulated scale inhibitor, which is relatively constant at a low level, indicated that degradation/dissolution of the polymer matrix was occurring. The trends in the data indicate a predicted degradation lifetime of between 12–14 months at 107° C.

Figure 7:
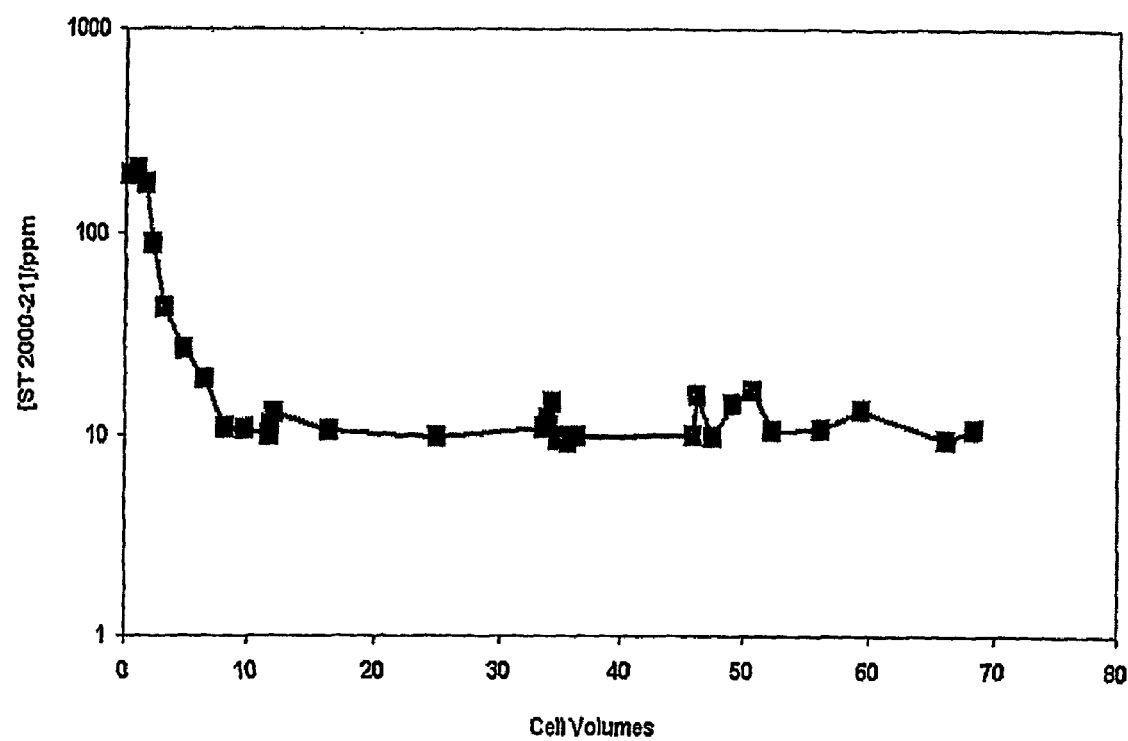
FIG. 7 shows scale inhibitor release profile under simulated rathole conditions for PHA polymer in produced brine at 107° C. in another embodiment.

FIG. 7 shows the concentration of scale inhibitor released versus the number of cell volumes of brine eluted at 107° C. The test was performed in a specially designed cell to simulate the release of scale inhibitor from a product placed in the rat hole. It can be seen from FIG. 7 that the PHA polymer matrix displays favourable scale inhibitor release characteristics, with the scale inhibitor being released at low levels over a long period.

The specific gravity of this material was ~1.2–1.3 and its compressive strength was >1000 psi. The product was also thermally stable in both brine and oil up to between 170–180° C.

Example 12

Extrusion Temperature 200–220° C.

This capsule was manufactured as detailed for the previous two examples and having the following proportion of constituents:

61% polyethylene terephthalate(PET)—as the polymer matrix material. This material can be added as a fine powder with an average particle size of 1–100 μm.

30% solid phosphonate—as a scale inhibitor salt. This material can be added as a fine powder with an average particle size of 1–100 μm.

9% titanium oxide oxidation catalyst—as a degradation additive. This material can be added as a fine powder with an average particle size of 1–100 μm.

The finished capsule is particularly suitable for scale control in rat hole applications. The material has been designed to degrade or slowly dissolve over 10–14 months.

Example 13

Extrusion Temperature 165–200° C.

This capsule was manufactured as detailed for the previous two examples and having the following proportion of constituents:

55% starch—as the polymer matrix material. This material can be added as a fine powder with an average particle size of 1–100 μm.

35% solid potassium hexacyanoferrate III—as a halite inhibitor salt. This material can be added as a fine powder with an average particle size of 50–500 μm.

10% Tungsten polyamide blend—as a weighting agent. This material can be added as a granule in masterbatch format with an average granule size of 500–3000 μm.

The finished capsule is particularly suitable for halite scale control in rat hole applications. The specific gravity of this material was ~1.1–1.3 and the material is thermally stable up to 140° C.

Example 14

Extrusion Temperature 165–200° C.

This capsule was manufactured as detailed for the previous two examples and having the following proportion of constituents:

70% polyamide—as the polymer matrix material. This material can be added as a fine powder with an average particle size of 1–100 μm.

30% solid enzyme—as the acid generating enzyme. This material can be added as a granule with an average particle size of 100–1000 μm.

This material is suitable for sand control and improved well clean up after completion in both injection and production wells.

Modifications and improvements may be incorporated without departing from the scope of the invention.

The invention claimed is:

1. A substance release device comprising:
    a solid water soluble inhibitor comprising at least one selected from the group consisting of: scale inhibitors, hydrate and halite inhibitors and corrosion inhibitors;
    a permeable polymeric material for releasing the solid water soluble inhibitor into a downhole fluid environment in a well, the polymeric material being resistant to water and oil degradation; and
    a strengthening agent to adjust the hardness, compressive strength and/or elastic properties of the device, the strengthening agent selected from the group consisting of glass, sand, carbon fibers and boron fibers;
    wherein the device has a specific gravity of between 0.9–2.0 and an unconfined compressive strength of between 500–100,000 PSI.

2. A device as claimed in claim 1, wherein the material comprises at least one selected from the group consisting of: polypropylene, polyethylene, high density polyethylene, high density polypropylene, polyethylene terephthalates, polyamides (both aliphatic and aromatic), liquid crystal polymers, liquid engineered resins, starch and polyhydroxy alkanoates.

3. A device as claimed in claim 1, wherein the material comprises a matrix that provides the material with structural support, and which contains the substance to be released.

4. A device as claimed in claim 3, wherein the material also contains at least one selected from the group consisting of: acrylic, polybutylene, polycarbonate, polyester, polystyrene, polyurethane, polyvinyl chloride, polycaprolactone, polybutylene terephthalate, polyvinyl alcohol, polylactic acid, polyglycolide, polyester amide, polyimides, acrylonitrile-butadiene-styrene, acrylonitrile-styrene-acrylate, polyoxymethylene, polyisobutylene, polyvinylbutyral, epichlorohydrin elastomer, nitrile elastomer, nitrile rubber, polyetherketone, polyetheretherketone, polyetherketoneketone, polymethylmethacrylate, polyethylene oxide, polyphenylene oxide, polysulphones, polyethersulphone, polyurea, chlorinated polyethylene, ethylene-chlorofluoroethylene, tetrafluoroethylene-perfluoropropylene, Perfluoroalkoxy, silicon rubbers and other polymeric materials consisting of mixtures of these, copolymers, terpolymers and hydrophobically/hydrophilically modified and crosslinked derivatives of these.

5. A device as claimed in claim 1, wherein the material contains one or more of the group of substances consisting waxes, calcium stearate, metallocene, thermoplastic rubber, resins, hot melt adhesives, fibreglass, silicones, fluorosilicones, polysiloxanes, fluoroelastomers, fluorocarbons, halogenated polymers, cellulose, polysaccharides, lignin, chitin, gums and mixtures and derivatives of the above.

6. A device as claimed in claim 1, comprising a generally spherical capsule.

7. A device as claimed in claim 1, wherein the material contains an active content of 10–90 wt %/o/v of inhibitor to be released.

8. A substance release device comprising:
    a solid water soluble inhibitor comprising at least one selected from the group consisting of: scale inhibitors, hydrate and halite inhibitors and corrosion inhibitors;
    a permeable polymeric material for releasing the solid water soluble inhibitor into a downhole fluid environment in a well, the polymeric material being resistant to water and oil degradation; and
    a weighting agent to adjust the density of the device, the weighting agent selected from the group consisting of: barite, zirconium oxide, manganese oxide, titanium dioxide, tungsten and magnetite;
    wherein the device has a specific gravity of between 0.9–2.0 and an unconfined compressive strength of between 500–100,000 PSI.

9. A device as claimed in claim 1, wherein at least one of the device and the material is pliable.

10. A method of treating a well, the method comprising:
loading a solid water soluble inhibitor into a permeable polymeric material to form a substance release device, the inhibitor comprising at least one selected from the group consisting of: scale inhibitors, hydrate and halite inhibitors and corrosion inhibitors, the polymeric material being resistant to water and oil degradation;
loading a strengthening agent to adjust the hardness, compressive strength and/or elastic properties of the device into the substance release device, the strengthening agent selected from the group consisting of glass, sand, carbon fibers and boron fibers, the device having a specific gravity of between 0.9–2.0 and an unconfined compressive strength of between 500–100,000 PSI;
inserting the device into the well, and
allowing the inhibitor to leach from the polymeric material into the well.

11. A method according to claim 10, wherein the material releases well cleanup substances.

12. A method as claimed in claim 10, wherein the material is inserted into one of a fissure, fracture, screen area, gravel pack, fracture pack and a pre-packed screen.

13. A method as claimed in claim 10, wherein the material is injected into a rathole.

14. A method as claimed in claim 10, wherein the material is used to support portions of one of the well, reservoir and formation in addition to releasing the substance.

15. A method according to claim 10, wherein the material controls entry of particulate matter into the production stream of the well.

16. A method as claimed claims 10, wherein the material is loaded with 10–90 wt %/v of active content of the inhibitor to be released.

17. A method as claimed in claim 10, wherein a number of the devices having a generally heterogeneous size distribution are delivered to the well.

18. A method as claimed in claim 10, wherein a number of the devices having a generally homogeneous size distribution are delivered to the well.

19. A method as claimed in claim 18, wherein the size distribution of devices delivered to the well is ±5% of the mean size.

20. A method as claimed in claim 17, wherein the range of sizes of the devices delivered to the well is 250 μm–5 mm.

21. A method of forming a substance-releasing particle for release of substances into a fluid environment in a well the method comprising mixing the substance to be released with a matrix material forming the particle, and thereafter forming the particle from the mixture of the matrix and the substance, so that the substance is dispersed throughout the formed particle.

22. A method of supporting a well or a portion thereof, comprising disposing a support material in the well or portion to be supported, wherein the support material comprises a device as claimed in claim 1.

23. A device as claimed in claim 1 for use downhole for the control of particulate matter entering the production stream of the well.

24. A method of controlling the entry of particulate matter into the production stream of a well, the method comprising disposing a number of polymeric devices into the wellbore between the formation and the production fluids outlet of the well, said devices as claimed in claim 1.

* * * * *